(12) United States Patent
Desharnais et al.

(10) Patent No.: US 7,139,082 B2
(45) Date of Patent: Nov. 21, 2006

(54) COMPUTER INTERFACED VIDEO POSITIONING SYSTEM MODULE

(75) Inventors: Francine Desharnais, Fall River (CA); Garry Heard, Dartmouth (CA); Richard Dittman, Dartmouth (CA)

(73) Assignee: Her Majesty the Queen in right of Canada, as represented by the Minister of National Defence of Her Majesty's Canadian Government, Ottawa (CA)

( * ) Notice: Subject to any disclaimer, the term of this patent is extended or adjusted under 35 U.S.C. 154(b) by 572 days.

(21) Appl. No.: 10/677,529

(22) Filed: Oct. 3, 2003

(65) Prior Publication Data

US 2004/0070770 A1 Apr. 15, 2004

Related U.S. Application Data

(60) Provisional application No. 60/415,801, filed on Oct. 4, 2003.

(51) Int. Cl.
G01B 11/24 (2006.01)

(52) U.S. Cl. .................................................. 356/601

(58) Field of Classification Search .................... None
See application file for complete search history.

(56) References Cited

U.S. PATENT DOCUMENTS 5,475,613 A * 12/1995 Itoga et al. ................... 702/39
6,256,090 B1 * 7/2001 Chen et al. ................ 356/73.1
6,836,285 B1 * 12/2004 Lubard et al. ................ 348/31

* cited by examiner

Primary Examiner—Tu T. Nguyen
(74) Attorney, Agent, or Firm—Stites & Harbison PLLC; Ross F. Hunt, Jr.

(57) ABSTRACT

An apparatus to determine the three-dimensional shape of an array under water using a CCD camera with a field-of-view directed towards the array and a plurality of LED light sources attached to the array which emit light near the attenuation minimum of the water and towards the camera. The camera obtains images of each light source individually from which the x and y co-ordinates of the images of each light source can be determined. Pressure sensors on each light source and camera determine the difference in depth between the camera and the light sources and, with the x and y co-ordinates, the apparatus determines the three-dimensional position of each light source.

20 Claims, 5 Drawing Sheets

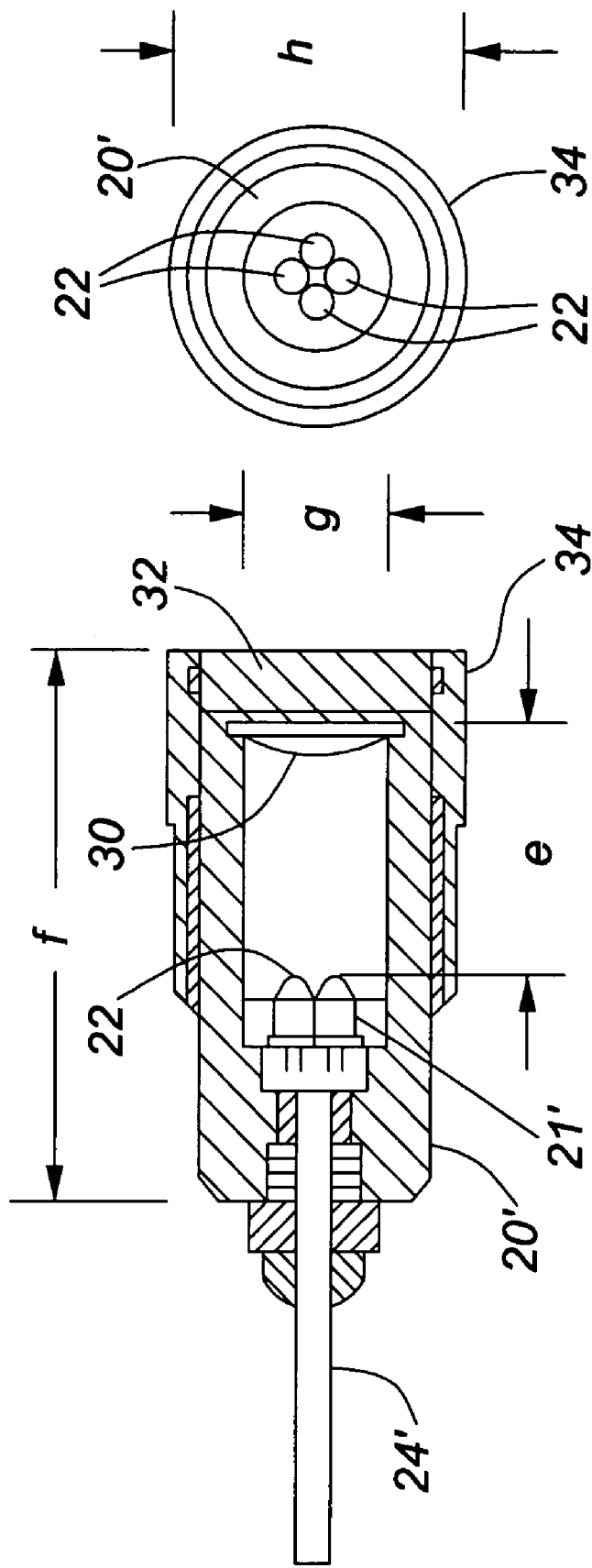

COMPUTER INTERFACED VIDEO POSITIONING SYSTEM MODULE

CROSS-REFERENCE TO RELATED APPLICATIONS

This application claims benefit of U.S. Provisional Application No. 60/415,801, filed Oct. 4, 2003.

FIELD OF THE INVENTION

The present invention relates generally to an apparatus to determine the shape of an array suspended underwater and in particular to determine the deflections of a hydrophone array used to measure underwater sound propagation.

BACKGROUND OF THE INVENTION

Oceanographic measurements made with moorings are often plagued by the action of ocean currents upon the cables or ropes used to secure instruments at a depth. These cables, ropes or harness assemblies drift and/or strum in response to water flowing by them. Hydrophone arrays used to measure sound propagation in the ocean are extremely sensitive to the effects of strumming and angular deflections caused by the action of currents. This is largely because the measurement of the sound propagation vectors is obtained from the serial excitation of hydrophones along a linear or predefined spatial vector. Deviations from the assumed orientation and location of hydrophones in the array introduce errors directly into the estimation of the propagation vectors and can even inhibit the excitation of certain hydrophones. Strumming of a mooring or array can also introduce acoustic noise directly into the signal.

Depth sensors can be used to correct some of the errors but only a time varied three dimensional map of an array's shape will be able to determine all the anticipated shape variations. This can, in principal, be derived by the use of an array of tilt sensors attached to the mooring and along the array but practice has shown that this approach is plagued by a number of hidden problems. These types of sensors are generally large and expensive and the data from the sensors require data processing to generate a Cartesian map of the array. Acoustic beacons could also be used to provide the needed information but such an approach goes against the covert nature of the hydrophone array.

SUMMARY OF THE INVENTION

It is an object of the present invention to determine a time varied three dimensional map of an underwater array with an optical positioning system to determine the array's shape.

It is a further object of the invention to map the shape of a hydrophone array in situ with an optical positioning system.

An apparatus to determine the shape of an array suspended under water, according to one embodiment of the present invention, comprises a CCD matrix camera with a field-of-view directed towards the array and a plurality of light sources attached to the array at various known locations and which emit light near the attenuation minimum of the water, the light sources being positioned to emit light towards the field-of-view of the camera, the camera having means to obtain an image of each light source individually, the apparatus having means to determine the x and y co-ordinates of an image of a light source, the apparatus having means to determine the position of each light source on the linear array from said x and y co-ordinates and the known locations.

An apparatus to determine the shape of a linear array suspended under water, according to a further embodiment of the invention, comprises a CCD matrix camera with a field-of-view directed along the length of the linear array and a plurality of light sources attached along the linear array that emit light near the attenuation minimum of the water, the light sources being positioned to emit light towards the field-of-view of the camera, the camera having means to obtain an image of each light source individually, the apparatus having means to determine the x and y co-ordinates of an image of a light source, pressure sensors being located on the light sensors and camera, the apparatus having means to determine the difference in depth between a light source and the camera from the pressure sensors, and means to determine the position of each light source on the linear array from said x and y co-ordinates and the difference in depth between a light source and the camera.

BRIEF DESCRIPTION OF THE DRAWINGS

The invention will now be described in more detail with reference to the accompanying drawings, in which:

FIG. 4A is a cross-sectional view of another light source for a mapping system according to the present invention and FIG. 4B is an end view of FIG. 4A.

DETAILED DESCRIPTION OF THE PREFERRED EMBODIMENTS

Oceanographic measurements made with moorings are often plagued by the action of ocean currents upon the cables or ropes used to secure instruments at a depth. These cables, ropes or harness assemblies drift and/or strum in response to the ocean currents. Hydrophone arrays used to measure sound propagation in the ocean are extremely sensitive to the effects of strumming and angular deflections caused by the action of currents. This is largely because the measurement of the sound propagation vectors is obtained from the serial excitation of hydrophones along a linear or predefined spatial vector. Deviations from the assumed orientation and locations of hydrophones in the array introduce errors directly into the estimation of the propagation vectors and can even inhibit the excitation of certain hydrophones in the array. Strumming of a mooring or array can also introduce acoustic noise directly into the signal.

Depth sensors can be used to correct some of the errors but only a time varied three dimensional map of the array's shape along its length will describe all anticipated shape variations that may occur. This can, in principal, be derived from the use of an array of tilt sensors attached to a mooring and along the array but practice has shown that this approach is plagued by a number of hidden problems. These sensors are generally large and expensive and data from those sensors require data processing to generate a Cartesian map of the array.

In the past, any type of optical positioning system to map an hydrophone array co-ordinates was restricted by the size and power limitations of camera systems and available light sources as potential tracking targets. Small low power cameras and high intensity, low power, solid state light sources available at present have made the use of an optical mapping system to map the co-ordinates of a hydrophone array possible. The primary limiting factor in using this approach is the attenuation of light by the water in which the array is deployed and it has been found that this can be satisfactorily countered with off-the-shelf technology that is now available.

Figure 1:
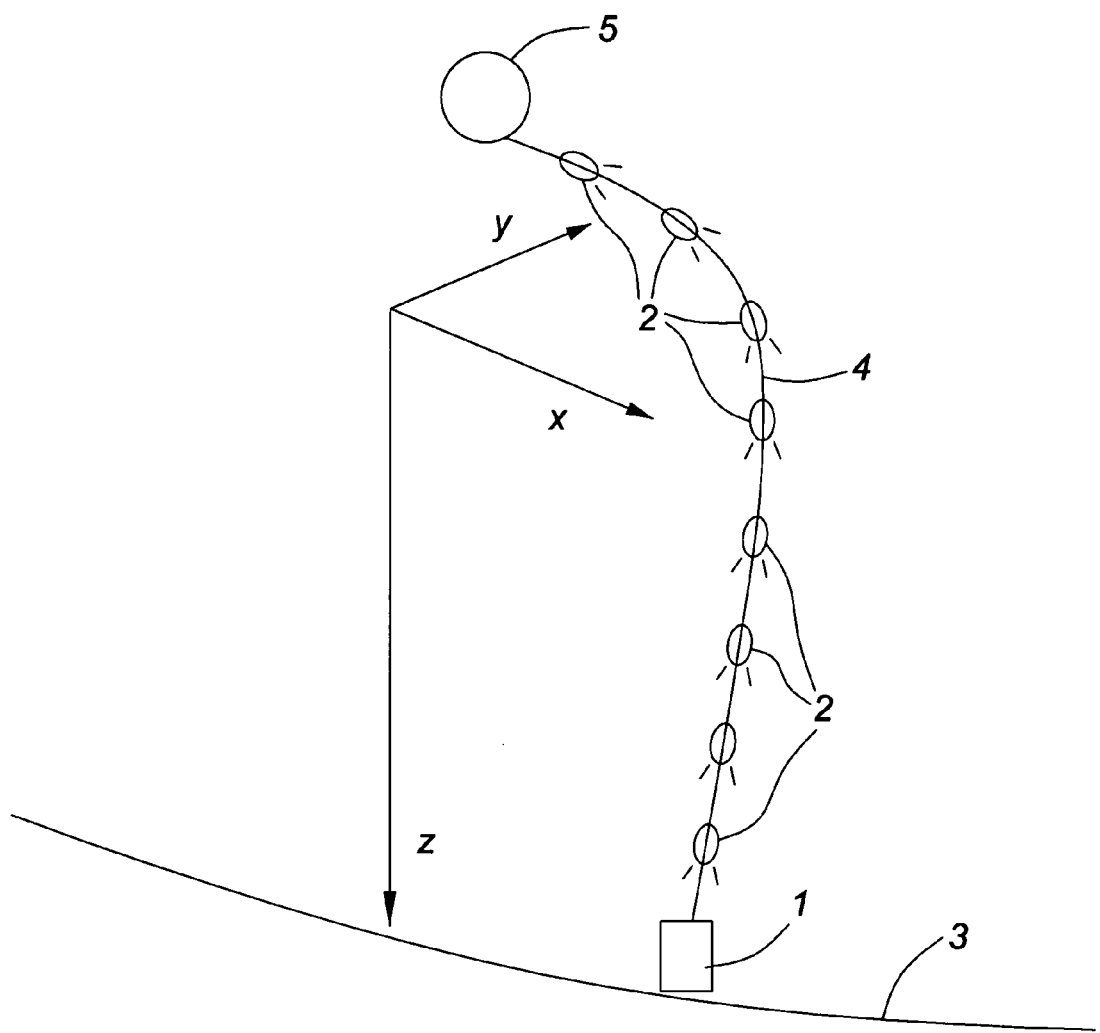
FIG. 1 is a diagram that illustrates an underwater linear array and an optical mapping system according to the present invention that determines deflections along the length of the array.

FIG. 1 is a diagram that illustrates an underwater linear array and an optical mapping system to determine deflections along the length of the array according to one embodiment of the present invention. This mapping system can be used to map types of arrays other than linear ones but will be described with respect to the linear array illustrated in FIG. 1. In the embodiment shown in FIG. 1, a linear array 4 of hydrophones (not shown) is attached to a buoy 5 at one end and the other end is attached to a CCD camera 1 that rests on the sea bottom 3. A number of target light sources 2 will be turned on sequently in order to sort their order in the image obtained by camera 1. This procedure will allow cross-overs in the array 4 to be identified and allow the camera 1 to adjust its video gain to suit each individual target light source 2 in its field-of-view. The maximum of each target's peak provides a triggering point with which to reference a target position within a given video frame.

The actual x and y co-ordinates of a target's image can be determined from the time offsets of the target's image and the frame and line sync pulses. The frame sync pulses, which repeat at 16 ms intervals, can be used to reference the "y" co-ordinates and the line sync pulses, which repeat at 50 μs intervals, can be used to reference the "x" co-ordinate inside each frame. The time offset of the target's signal is actually directly related to the angular displacement of the peak off of the center of the lens since the image is spherical. Offsets must first be converted into angles θ', φ' and, with an estimate of target range, can map the array 4 in three dimensions.

Figure 2A:
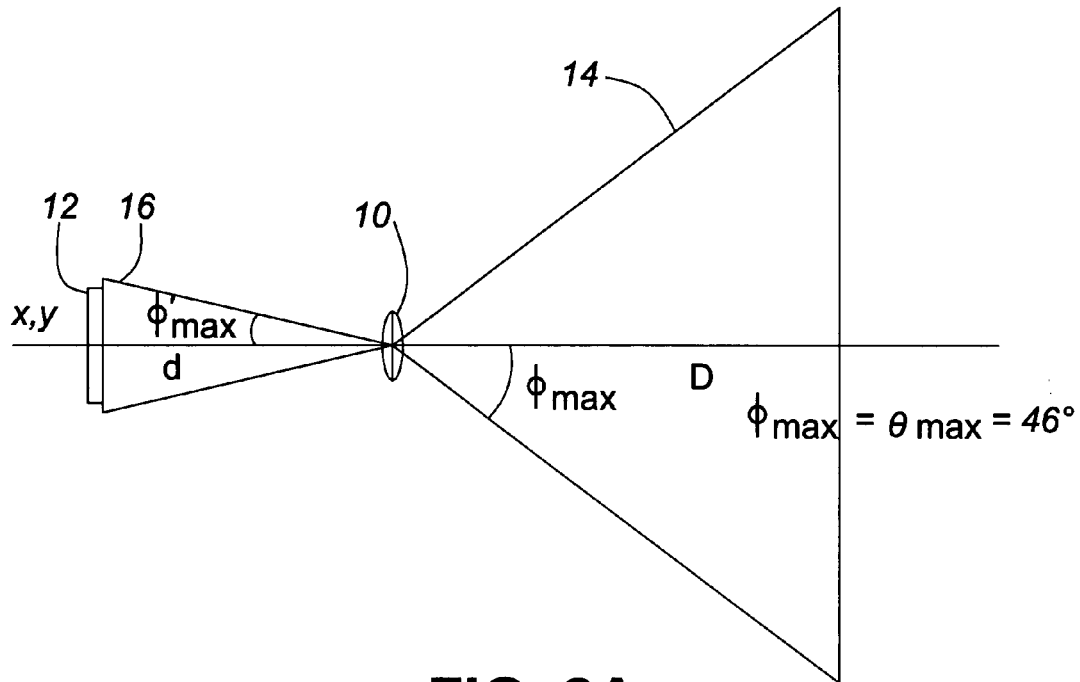
FIG. 2A is an optical diagram of a camera system used in the mapping system of FIG. 1
Figure 2B:
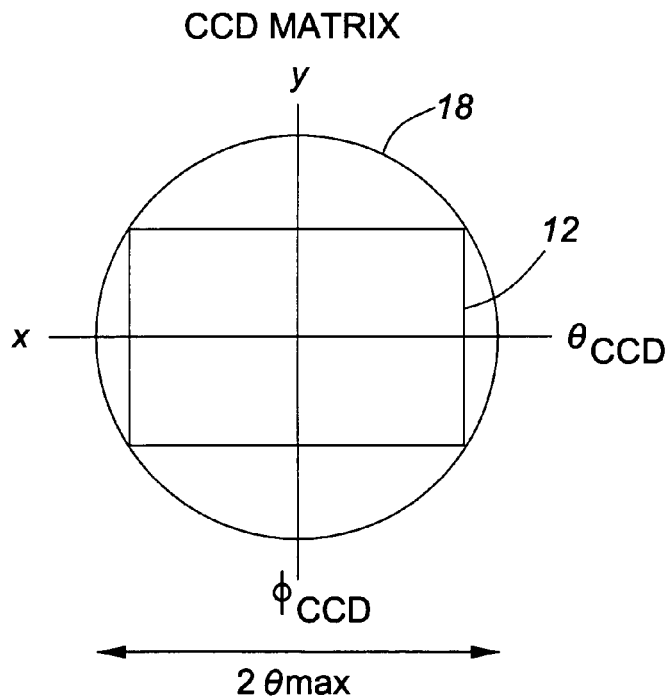
FIG. 2B shows the image field of that camera that is projected onto its CCD matrix.

FIG. 2A presents a side view of how the "x" and "y" co-ordinates of a target's image are derived from the position of its image upon the CCD matrix 12 of the camera. In FIG. 2A, the field-of-view 14 of lens 10 is focused at 16 onto the CCD matrix 12. FIG. 2B shows the circle 18 defining the limit of images created with the camera's lens 10 and a representation of the CCD matrix 12 within the image limits 18.

The x axis co-ordinate is determined by $$\theta'=F_{lens}(2t_x/T_{line}-1)\theta_{CCD} \quad (1)$$

where $t_x$=time offset of the peak relative to the line sync pulse,
$T_{line}$=period of the line sync pulse,
$F_{lens}$=the lens compression factor, i.e. $\theta'=F_{lens}\theta$, and
$\theta_{CCD}$=half the angular field-of-view along the x axis of the CCD matrix.

The y axis co-ordinate is determined by $$\phi'=F_{lens}(2t_y/T_{frame}-1)\phi_{CCD} \quad (2)$$

where $t_y$=time offset of the peak relative to the frame sync pulse,
$T_{frame}$=period of the frame sync pulse, and
$\phi_{CCD}$=half the angular field-of-view along the y axis of the CCD matrix.

The actual x and y co-ordinates of a light source can be calculated as $$X=D \tan \theta' \quad (3)$$

$$Y=D \tan \phi' \quad (4)$$

where D is the depth difference between the camera 1 and a target 2. The values of $t_x$ and $t_y$ can be determined using a simple timing circuit triggered by the video synchronization pulses and the peak of the target image in a given video frame. The depth difference can be determined by pressure sensors on the camera and light sources 2.

Operation of this system is dependent on limitations imposed by the losses of the tracking target's light in the seawater. Light emitted by the targets 2 can be lost from the view of the camera through two independent processes. The first results from the optical geometry of the targets 2 and camera 1 while the second is due to the optical attenuation of the water through which the light passes. The geometric light loss can be corrected by altering the field-of-view of the camera but attenuation is determined entirely by the environment. The attenuation that degrades the image obtained by the camera is dependent on the intensity of target light source, its distance from the camera, the camera's design, its video gain and material in the water. The light flux of the beams from a target light source decrease as a square of the range and simultaneously decrease exponentially as a result of attenuation. That attenuation may be due to particles or dissolved material in the seawater.

While it is essential to have a camera with both a high level of spatial resolution and sensitivity as the positional detector in this position determining system, it is also imperative that the target projectors have optimal luminosity and beam properties. To investigate which beam properties make the targets most detectable by the camera, two different prototype designs were constructed. Each used commercial-off-the-shelf T-1¾ LEDs (light emitting diodes) with emission peaks within the attenuation minimum of seawater.

Figure 3B:
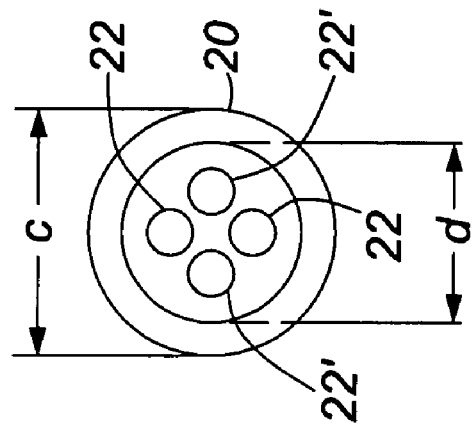
FIG. 3A is a cross-sectional view of a light source that could be used in the mapping system according to the present invention and FIG. 3B is an end view of FIG. 3A.
Figure 3A:
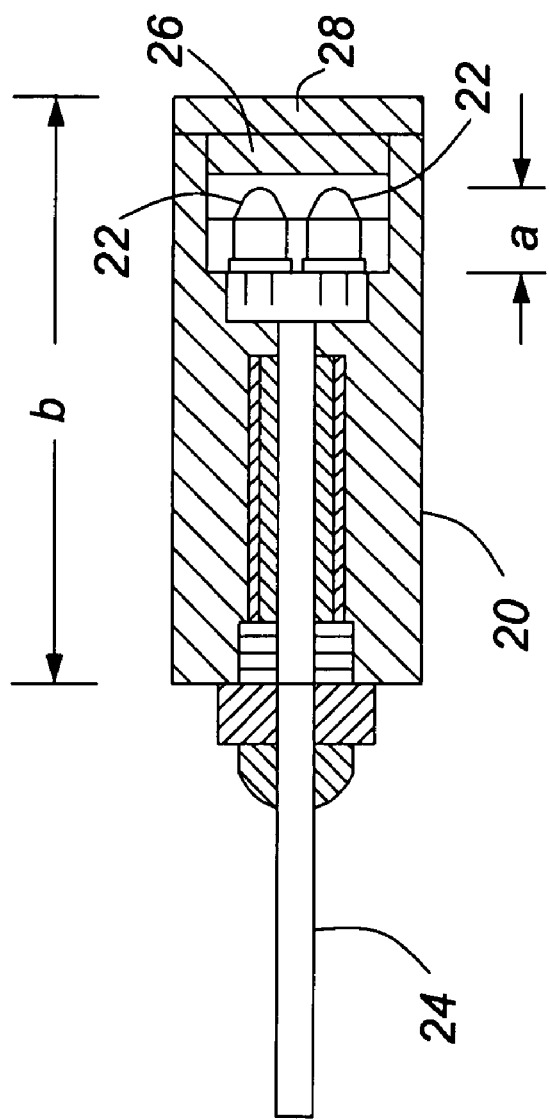

The first prototype target projector constructed is illustrated in the cross-sectional view in FIG. 3A and end view in FIG. 3B. This design was constructed with two different types of LEDs 22 and 22'. One pair of LEDs were blue Gallium Nitride LEDs with an emission peak near 470 nm and the other pair were of a new green-shifted design that had a peak emission near 490 nm. The intention of combining the two types of commercial-off-the-shelf LEDs was that the two emission peaks would overlap to yield a broad emission peak centered near 480 nm which is the attenuation minimum of pure water. The blue pair (470 nm), however, were slightly more focused than the blue-green (490 nm) LEDs and they, as a result, appeared less intense although both had comparable emissions greater than 3000 millicandles with a continuous forward current of 30 mA. The four LEDs 22 and 22' were mounted in a machined plastic collar placed in a central cavity at one end of a cylindrical acrylic pressure housing 20 which end is closed by transparent windows 26 and 28. These LEDs were slightly separated from each other and the axis of the lenses are parallel to each other. Leads 24 are connected to the LEDs and are hermetically sealed in housing 20. The length b of housing 20 was 6.25 cm with an outside diameter C of 2.54 cm and inside diameter d of 1.90 cm. The distance a from the base of the cavity to the LED's tips is 0.85 cm.

The second prototype target projector constructed is illustrated in the cross-sectional view in FIG. 4A and end view in FIG. 4B. This second design used a condensing lens 30 to optimise on the LEDs beam power and had a cluster of four high intensity LEDs 22, each supplied with 32 mA of continuous power through leads 24'. This second design, however, only used the Gallium Nitride (470 nm) LEDs since the green-shifted devices appeared less focused and the spectral advantages gained by their original addition were outweighed by the losses associated with their beam properties. The LEDs 22 in this prototype are physically packaged in a cylindrical pressure housing 20' and spaced with the smallest inter-unit distance possible rather than spaced apart as in the first prototype. Each LED 22 was canted inwards to the center of the cluster of LEDs so that the smallest cross-sections of the LED's lenses are aligned next to one another. The cluster was held in place in housing 20' with epoxy so that the axis of each LED passes through the center of a 2.5 cm single condensing lens 30 placed 3 cm (the distance e in FIG. 4a from the LEDs). The opening in the housing 20' next to lens 30 was hermetically sealed with a window 32. The length f of this housing is 4.91 cm with an outer diameter h of 3.53 cm and inner diameter g of 2.53 cm.

The beam pattern of the first prototype target projector was diffused with a dispersion angle of approximately +/−15°. The beam pattern of the second projector was, in contrast, focused and generated a four loped beam pattern with each lobe provided by the beam of a single LED. This beam was 18 cm high and wide at 1 meter and this corresponded to a beam dispersion angle γ of 5°. Each LED possessed a dispersion angle of 2.5° about its center and this made the target's beam intensity more than 9 times greater than that of the first prototype.

The effective detection limit of the optical system is a limiting factor in its functionality in the field. Therefore, a series of range limit tests were conducted in air and in water. Tests in air used the prototype projectors in a system with a series of neutral density filters mounted in front of the camera to simulate attenuation by a water column. The range limit was determined as the point beyond which the target could no longer be seen in the image from a camera as observed on a television screen set with maximum brightness and contract.

Water tests of the prototype systems were conducted in both fresh water and in seawater. The fresh water tests took place through the ice of a lake near Halifax, Nova Scotia. Both designs of target projector were range limited tested at night through holes cut in the ice. The camera was mounted horizontally beneath the ice, the targets at fixed distances along the ice. Ranges were varied by moving a target through a series of different holes cut through the ice. The image of the target was monitored with a television and an estimate of the maximum range was set at the point at which the image of a target disappeared from the screen.

Figure 5:
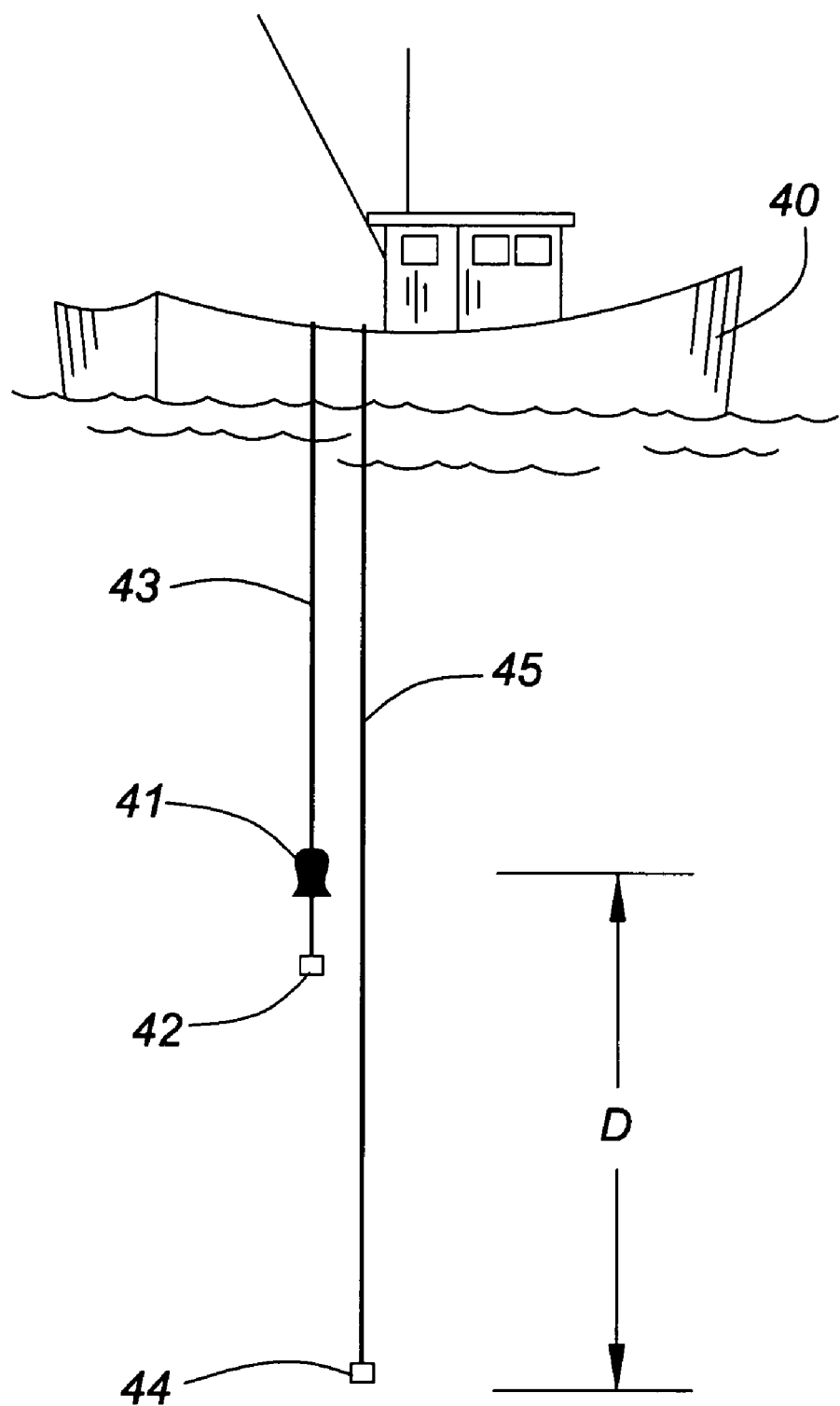
FIG. 5 is a diagram of a system used to test various elements of the present invention.

Two separate expeditions were undertaken within Bedford Basin in Halifax, Nova Scotia, Canada for tests in seawater. These tests were conducted after dark with the system orientated vertically as illustrated in FIG. 5. The systems camera was mounted looking downwards from the base of an instrument package 41 having a pressure sensor that is connected to a boat 40 by cable 43. A reference LED light source 42 extends downward from camera 41 to provide a center for the image's axis.

The target projector LED cluster 44 was lowered by cable 45, independent of the camera 41, until it was visible in the image from camera 41. The target projector 44 was then further lowered and its detection range D was calculated from pressure sensors on the camera 41 and on the target projector 44. The range limit was determined at the depth of the target where the image from the camera could no longer determine that target's image as observed on a television screen.

The results of the analysis of the range limit of the prototype system with the neutral density filters suggested that detection ranges of as much as 65 meters were possible underwater but only with the second prototype design of LEDs cluster. The dispersion of the first prototype design would limit detection ranges closer to 40 meters.

The size of the target's image and the width of its associated peak decreased with increased range until only a single pixel was illuminated. The amplitude of the image's peak remained constant until the limits of an automatic gain control (AGC) was reached and then rapidly decreased until the image was no longer resolvable from the background.

The results of the range limit tests conducted in Bedford Basin, however, indicated that the maximum viewing envelope would be substantially smaller than that predicted by tests in air under certain conditions. In the Bedford Basin tests, the first design of an LED projector could be detected up to 18 meters away from the camera whereas the second LED projector design could be detected up to 23 meters from the camera. These values were less than half of those predicted with neutral density filters. The difference was the result of large amounts of suspended particles visible in the images observed on both expeditions. The fact that no clear thermo-cline could be resolved on both occasions suggested that the water column had been mixed by several consecutive wind storms to depths greater than those in the basin. These tests showed that attenuation by materials in the water can, under certain circumstances, impede the detection range of the system. These can, however, be reduced by locating a camera (or cameras) at different depths so that different positions of an array are in a camera's field-of-view. Each camera in this type of system should be located such that it can obtain an image of one adjacent camera or a light source on that adjacent camera.

The attenuation of the detection range by materials in the water was further exemplified by the results of range limit testing in the freshwater lake under the ice. The effects in that testing area are believed to be due to dissolved organic substances called humic acids which limited the detection range of the system to less than 7 meters. These conditions are, however, only expected to occur in near shore waters where run off from lakes and rivers introduce a variety of potential attenuators into the upper water layers.

Tests in the arctic at Alert in the North West Territories allowed the targets to be accurately tracked at ranges up to 48 meters.

In the first projector design, the packaging of each of the individual LEDs dictated how the light is emitted from the pressure housing underwater. The emitted light is projected evenly over four overlapping 30° cones. It appears diffuse and, when viewed underwater, appears as if it were from a point source. This results in a clean Gaussian type voltage peak in the video signal. This type of image is preferred since it allows the intensity peak to be directly associated with the center of the projector. The angular resolution of the camera is near 0.2° so the camera can only resolve individual LEDs in a cluster at ranges that are less than 3 meters.

When a target projector is within what can be called the near field of the camera, the light intensities from a projector can saturate the CCD elements in the camera's CCD matrix. This results in the top of the image's peak becoming flattened and too wide to provide a good position estimation. The effects of the beam shape and its saturation effect are particularly noticeable with the second projector's design. These effects can be reduced, however, by scaling the LEDs intensities based on their position in an array but this requires some pre-determined knowledge of the attenuation properties of a water column in which the array is submerged. An alternative approach would require the camera's AGC to be modified or to use an AGC amplifier with both a wider dynamic range and more steps within that range. A combination of these approaches could also be used.

A prototype optical positioning system to estimate in-situ shape variations in hydrophone arrays utilized off-the-shelf video technology coupled through a computer interface to a logging and presentation device such as a laptop personal computer. This system determined array shape variations by mapping the 3-D spatial co-ordinates of high intensity LED target light sources mounted along the length of the array. Target co-ordinates were derived through their location within the image of a video camera and the depth separation between the camera and a specific target determined by pressure sensors on the camera and targets. This particular system was a hybrid analog/digital system employing a high sensitivity black and white video camera as the spatial sensor, a counter module to position select targets in the video frames and an interface computer to synchronize and download count information from the counter module to a personal computer. A single chip interface computer was responsible for driving the pulse timing of the camera and the LED strobes so that a strobe flashes in synchrony with the frame timing of the pulsed camera. A different strobe flashes for each successive frame image from the camera. This results in a low power system drawing 550 milliamperes but only during an 80 millisecond pulse. This low power requirement coupled with the system's compact size allow it to be easily incorporated into compact packages within existing hydrophone array systems. The data outputted was in standard ASCII format with the 3 variables describing the co-ordinates of the targets within the field of view of the camera as a function of time.

The pressure sensors to determine the depth D between the camera and each target light sources are not always required when the array is submerged in a steady current. In that type of situation, knowing the locations target light sources are attached to the array would be sufficient to map the shape of the array from the "x" and "y" co-ordinates of images of the target light sources obtained by a video camera and the known locations.

Various modifications may be made to the preferred embodiments without departing from the spirit and scope of the invention as defined in the appended claims. Four large LEDs were used in the present strobes design but a large number of smaller LEDs could, for instance, be mounted in a spherical fashion to generate illumination over different angles.

The invention claimed is:

1. An apparatus to determine the shape of a linear array suspended under water comprising a CCD matrix camera with a field-of-view directed along the length of the linear array and a plurality of light sources attached along the linear array that emit light near the attenuation minimum of the water, the light sources being positioned to emit light towards the field-of-view of the camera, the camera having means to obtain an image of each light source individually, the apparatus having means to determine the x and y co-ordinates of an image of a light source, pressure sensors being located on the light sources and camera, the apparatus having means to determine the difference in depth between a light source and the camera from the pressure sensors, and means to determine the position of each light source on the linear array from said x and y co-ordinates and the difference in depth between a light source and the camera.

2. An apparatus as defined in claim 1, wherein the light sources are light emitting diodes (LEDs).

3. An apparatus as defined in claim 2, wherein each light source comprises a plurality of LEDs hermetically sealed in a pressure housing.

4. An apparatus as defined in claim 3, wherein each light source has a lens located between the LEDs and a window in the housing.

5. An apparatus as defined in claim 4, wherein the LEDs form a cluster and are canted inwards to the center of the cluster such that each LED's axis passes through the len's center.

6. An apparatus as defined in claim 5, wherein the LEDs are Gallium Nitride LEDs.

7. An apparatus as defined in claim 4, wherein the LEDs are Gallium Nitride LEDs.

8. An apparatus as defined in claim 3, wherein the LEDs are Gallium Nitride LEDs.

9. An apparatus as defined in claim 2, wherein the LEDs are Gallium Nitride LEDs.

10. An apparatus as defined in claim 2, wherein a plurality of LEDs in each light source are mounted in a manner to generate illumination over different angles.

11. An apparatus as defined in claim 1, wherein a plurality of cameras are located at different depths such that different portions of the array appear in each camera's field-of-view, each camera after a first camera nearest a surface of the water being positioned such that any one of those cameras can obtain an image of a light source on an adjacent camera.

12. An apparatus to determine the shape of an array suspended under water comprising a CCD matrix camera with a field-of-view directed to the array and a plurality of light sources attached to the array at various known locations and which emit light near the attenuation minimum of the water, the light sources being positioned to emit light towards the field-of-view of the camera, the camera having means to obtain an image of each light source individually, the apparatus having means to determine the "x" and "y" co-ordinates of an image of a light source, the apparatus having means to determine the position of each light source from said "x" and "y" co-ordinates and the known locations.

13. An apparatus as defined in claim 12, wherein the light sources are light emitting diodes (LEDs).

14. An apparatus as defined in claim 13, wherein each light source comprises a plurality of LEDs hermetically sealed in a pressure housing.

15. An apparatus as defined in claim 14, wherein each light source has a lens located between the LEDs and a window in the housing.

16. An apparatus as defined in claim 15, wherein the LEDs are Gallium Nitride LEDs.

17. An apparatus as defined in claim 14, wherein the LEDs are Gallium Nitride LEDs.

18. An apparatus as defined in claim 13, wherein the LEDs are Gallium Nitride LEDs.

19. An apparatus as defined in claim 12, wherein the light sources are Gallium Nitride light emitting diodes (LEDs).

20. An apparatus as defined in claim 12, wherein a plurality of cameras are located at different depths such that different portions of the array appear in each camera's field-of-view, each camera after a first camera nearest a surface of the water being positioned such that any one of those cameras can obtain an image of a light source on an adjacent camera.

* * * * *